United States Patent [19]

Hegemann et al.

[11] Patent Number: 4,477,653

[45] Date of Patent: Oct. 16, 1984

[54] UNSATURATED HOMO- AND/OR COPOLYMERIZABLE POLYESTERS

[75] Inventors: Günther Hegemann; Karin Miedeck, both of Hamburg, Fed. Rep. of Germany

[73] Assignee: BASF Farben & Fasern AG, Münster Hiltrup, Fed. Rep. of Germany

[21] Appl. No.: 519,488

[22] Filed: Aug. 1, 1983

[30] Foreign Application Priority Data

Sep. 8, 1982 [DE] Fed. Rep. of Germany ....... 3229618

[51] Int. Cl.³ .................... C08G 69/44; C08G 73/16
[52] U.S. Cl. ................................. 528/289; 525/440; 525/445; 528/303; 528/304; 528/306
[58] Field of Search ............... 528/289, 303, 304, 306; 525/440, 445

[56] References Cited

U.S. PATENT DOCUMENTS

| | | | |
|---|---|---|---|
| 3,896,098 | 7/1975 | Lasher | 525/445 X |
| 4,066,586 | 1/1978 | Tanuma et al. | 525/440 X |
| 4,089,825 | 5/1978 | Lawson | 525/445 |
| 4,241,199 | 12/1980 | Dunleavy | 525/440 X |
| 4,251,641 | 2/1981 | Arakawa et al. | 525/445 X |
| 4,254,230 | 3/1981 | Howard | 525/440 X |
| 4,284,760 | 8/1981 | Millick et al. | 525/445 X |
| 4,298,711 | 11/1981 | Moulson et al. | 525/445 X |
| 4,311,814 | 1/1982 | Ochsenbein et al. | 528/303 X |
| 4,355,123 | 10/1982 | Dudgeon | 525/445 X |

*Primary Examiner*—Lucille M. Phynes
*Attorney, Agent, or Firm*—Kenyon & Kenyon

[57] ABSTRACT

The invention is related to unsaturated homo- and/or copolymerizable linear polyesters which are prepared from diols and at least one unsaturated dicarboxylic acid or its derivatives capable of forming esters. The polyesters contain as component (A) a diol with end-position hydroxyl groups and an average molecular weight of 700 to 1200; as component (B) one or more unsaturated dicarboxylic acids; and as component (C) a linear diol with 2 to 6 carbon atoms. The equivalent ratio of A:B is from about 0.8:1 to 1.2:1 and the equivalent ratio of C:(A+B) is from about 0.5:1 to 1:1.

16 Claims, No Drawings

UNSATURATED HOMO- AND/OR COPOLYMERIZABLE POLYESTERS

BACKGROUND OF THE INVENTION

The invention relates to unsaturated homo- and/or copolymerizable linear polyesters, prepared from diols and at least one unsaturated dicarboxylic acid or its derivatives capable of forming esters; a method for manufacturing same and their use.

Homo- and/or copolymerizable unsaturated polyesters, are known compounds as are methods for their manufacture and processing. Thus, unsaturated polyester resins can be produced by copolyesterification of mono- and/or multivalent alcohols with mono- and/or multivalent carboxylic acids and/or, optionally, hydroxy-carboxylic acids containing alcoholic hydroxyl groups or also using or co-using their derivatives capable of forming esters. In the process, at least one compound which is olefinically unsaturated and homo- or copolymerizable, is condensed into the polyester resin where the average functionality and the ratio of hydroxyl to carboxyl groups must be chosen according to rules well known in the art so that the formation of polyesters is assured. These resins can then be hardened into thermo-setting plastics also in thick layers particularly after the addition of radical-providing compounds and, optionally, after the addition of olefinically unsaturated copolymerizable monomers.

These known polyesters are used particularly in the form of their solutions in copolymerizable vinyl and/or allyl monomers as casting resins for impregnating electric machinery or parts thereof. They are useful to impregnate, for instance, stators of electric motors or transformers by different impregnating methods such as immersion or sprinkling. Furthermore, electrical or electronic components or complete circuits can be superficially coated with them.

After the immersion of the machinery or components, they are conducted through an evaporation and dripping zone and then the adhered polyester resin is hardened in an oven. With this method, dripping losses first occur in the dripping zone. Even though the resin accumulating here can be returned to the immersion tank, there is the disadvantage that the dripping leads to an incomplete impregnation. Furthermore, additional dripping losses occur in the oven prior to the hardening if the viscosity of the casting resins drops due to the increase in temperature. This is particularly disadvantageous because the material dripping off in the oven hardens and cannot be reused. It also leads to considerable contamination of the oven.

A further problem which results from the dripping-off or running-down of the casting resins is the occurrence of nonuniform layer thicknesses which increase from top to bottom, and the development of beads at the lower edge of coated components.

To avoid these disadvantages, it is known to generate structural viscosity or thixotropy in the casting resins by adding to them substances which produce flow anomalies. For this purpose, substances such as pyrogenic silica, asbestos fibers, quartz meal, microdolomite and liquid components such as castor oil derivatives, acrylic resins or silicone resins are customarily used. The use of these additives gives rise to several disadvantages. The inorganic components do not yield clear solutions and it is not always simple to work them into the polyester resins. The above-mentioned liquid components are disadvantageously present in the resins as softeners. Further, a skin can develop on the casting resins if these additives are used.

It is an object of the invention to avoid these disadvantages and to create polyesters which exhibit useful flow anomalies due to their molecular structure and which exhibit structural viscosity or thixotropic behavior without the addition of supplementary additives.

BRIEF DESCRIPTION OF THE INVENTION

It has now been found surprisingly that this problem can be solved by the incorporation of long-chain alcohols into the polyesters, where these long-chain alcohols replace part of the customary low-molecular alcohols.

The subjects of the invention are therefore unsaturated homo- and/or copolymerizable linear polyesters of the type mentioned hereinabove which are characterized by the feature that the polyesters contain as component (A) a diol with end-position hydroxyl groups and an average molecular weight of about 700 to 1200, as component (B) one or more unsaturated dicarboxylic acids selected from the group consisting of maleic acid, fumaric acid, itaconic acid, citraconic acid, mesaconic acid and aconitic acid or their derivatives, and as components (C) a condensed-in linear diol with 2 to 6 carbon atoms, where the equivalent ratio A:B is from 0.8:1 to 1.2:1 and the equivalent ratio C:(A+B) is from 0.5:1 to 1:1.

DETAILED DESCRIPTION OF THE INVENTION

The polyesters of this invention exhibit structural-viscosity or thixotropic behavior without the addition of the substances customarily used for achieving the mentioned flow anomalies.

The component (A) is advantageously a polyester diol. Thereby, good compatability is achieved if the polyester according to the invention is used in a mixture with other unsaturated polyesters.

Polyester diols particularly suited for use as component (A) of this invention are those which are obtained by the glycolysis of polyethyleneterephthalate. Glycolysis is understood to mean the decomposition of high molecular weight polyethyleneterephthalate into low-molecular weight polyester diols by heating polyethyleneterephthalate in the presence of glycols. The polyester diols obtained in this manner impart, on the one hand, the desired flow anomalies to the unsaturated polyesters according to the invention and are, on the other hand, readily accessible by adjusting the reaction conditions to the desired range of molecular weights. Utilization of polyethyleneterephthalate wastes can also be considered here, whereby particular economy is provided.

The polyester diols preferred as component (A) are obtained by the reaction of polyethyleneterephthalate with propylene glycol in the weight ratio of polyethyleneterephthalate:propylene glycol of about 8:1 to 12:1. Propylene glycol is preferred because of its boiling point which is favorable with respect to the melting point of the polyethyleneterephthalate.

From the large field of prior knowledge regarding the preparation of unsaturated polyesters, a number of reactants will be named below which may be employed in accordance with this invention. The following, for instance, can be used as component (C): glycol, propane diols, butane diols, hexane diols.

Homo- or copolymerizable olefinically unsaturated compounds which are used for the preparation of unsaturated polyesters and may also be employed in accordance with the present invention include: maleic acid, fumaric acid, itaconic acid, citraconic acid, mesaconic acid and aconitic acid. Instead of the free acids, their functional derivatives such as esters, anhydrides or chlorides can also be used in a known manner.

To increase continuous thermal stressability of the unsaturated polyesters according to the invention in the hardened condition, the polyesters are advantageously modified by nitrogen-containing compounds of the general formulae:

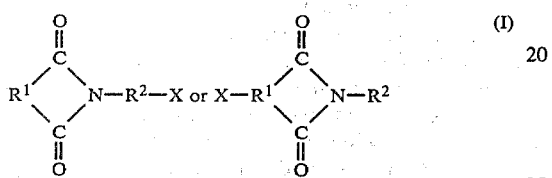

(I)

wherein $R^1$ is an aliphatic radical in which the two carboxyl radicals capable of forming anhydrides are in the 1,2- or 1,3-position; $R^2$ is an alkyl or aryl radical and X is an OH or $CO_2H$ radical where optionally the linkage of the hydroxyl groups of the nitrogen-containing compounds to the hydroxyl groups of the unsaturated polyester may be accomplished with di- or triisocyanates.

As a simple representative of these nitrogen-containing compounds which always comprise an imide ring A and can be used as the end group, the following compound (a) will be mentioned here, which can readily be prepared from phthalic-acid anhydride and monoethanolamine:

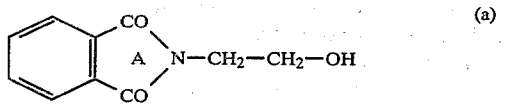

(a)

Modifications of this simple model are readily obtainable if substituted, partially hydrogenated or more complicated derivatives of the o-phthalic-acid are employed instead of simple phthalic-acid anhydride. For instance, halogenated phthalic-acid anhydrides (tetrachloro- or tetrabromo-phthalic-acid anhydride), alkylated or hydrogenated systems (methyl, tetrahydro, hexahydro, methylhexahydro, endomethylenetetrahydro-phthalic-acid anhydride). An entirely different shape of the ring A is arrived at if compounds such as maleic or citraconic acid, succinic acid or derivatives and alkylated derivatives or the addition products of maleic or citraconic acid with dicyclopentadiene, unsaturated ketones or diolefins are chosen. However, compounds such as trimellitic acid anhydride may also be used. This acid yields, when reacted with a suitable amine such as monobutylamine, a building block (b) in which the radical X is represented by the carboxyl radical attached to an aromatic ring.

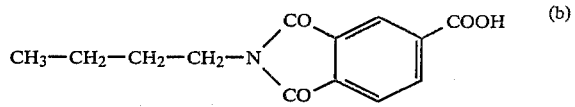

(b)

Compounds such as 1,8-naphthalene dicarboxylic acid or naphthalene-1,2-dicarboxylic acid in the form of their anhydrides (c, d) likewise belong here, and further formula diagrams (e to g) show further variation possibilities.

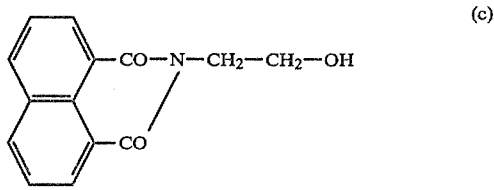

(c)

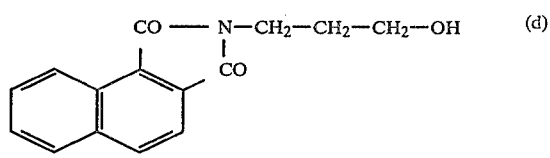

(d)

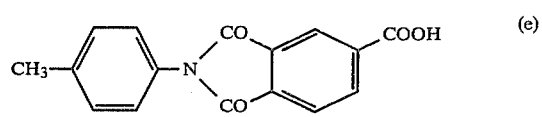

(e)

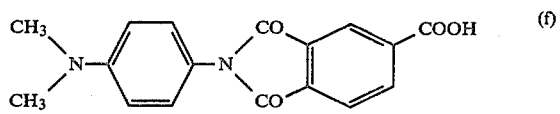

(f)

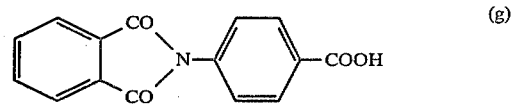

(g)

On the other hand, the simple ethanolamine can be replaced by the most varied amino compounds, for instance, by the isomeric propanol or butanol amines or other higher homologs, by phenyl ether alcohols aminated in the ring, or aminocarboxylic acids or ethoxylation of phenols aminated in the ring.

These and similar compounds, for the manufacture of which no protection is to be sought here, can be obtained in a known manner by moderate heating of the components in solution or a melt, and can be isolated in many cases as highly crystalline compounds. However, one can also proceed without isolation of the intermediate products by including either the product preformed in a melt or solution, such as introducing a monofunctional compound into the structure of an unsaturated polyester by admixing the raw materials and by heating them together, or by condensing the imide building block to fuse it with an already largely preformed unsaturated polyester still containing free OH or COOH groups and condensing the product immediately afterwards with the prepared unsaturated polyester to afford the end product. At any rate, the durability limits and other properties of the imide building block must, of course, be taken into consideration.

The addition of the imide end groups is accomplished very smoothly via diisocyanates, where either the prefabricated hydroxyl polyester is reacted with excess isocyanate, as shown below, whereupon a reaction with a hydroxyl imide building block can take place at the still active NCO groups:

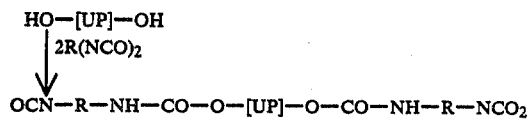

UP = unsaturated polyester or a hydroxyl-imide system is first reacted with excess diisocyanate and the product is brought to reaction with a hydroxyl polyester:

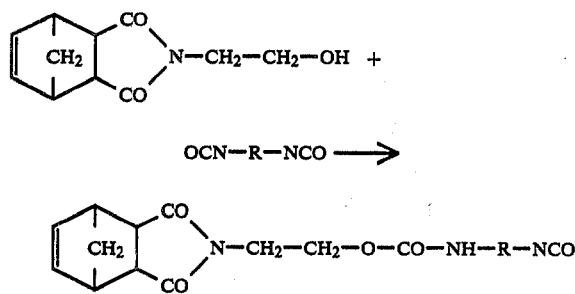

These rather differently structured imide building blocks, which function as a monofunctional end group, determine the chain length, the molecular weight, the molecular shape and thereby, the technically important viscosity.

Besides these monofunctional imide building blocks, the imide radicals can also be incorporated into the polyester via difunctional building blocks. Advantageously, radicals of a dicarboxylic acid, a dialcohol and/or a hydroxycarboxylic acid with at least one five-membered cyclic imide group are condensed into the polyester for this purpose. The compounds which contain one or more five-membered cyclic imide groups and are to be used in the preparation of the polyesters must contain two functional groups which intervene into the formation reaction of the unsaturated polyester resin. Useful for this purpose are diols, divalent carboxylic acids and/or hydroxycarboxylic acids or their derivatives capable of forming esters. They contain per molecule at least one five-membered imide ring. In a particularly important embodiment of the invention, the imide rings are arranged in the molecule so that the functional groups intervening in the polyester resin formation are in connection with each other, skipping various ring members of the imide rings. Such dicarboxylic acids and dialcohols or hydroxycarboxylic acids are known, specifically from the state of the art which relates to the preparation of saturated polyester resins containing imide rings. Reference is made here, for instance, to the disclosures of British Pat. No. 973,377 and French Pat. No. 1,368,741. The compounds can be prepared by known methods, for instance, from compounds containing primary amino groups with compounds which are capable of forming cyclic imide groups and contain at least two carboxyl groups with the provision that the starting molecules used for forming an imide group-containing molecule together further contain two groups which are capable of forming esters and are not used for the formation of the imides.

The compounds containing imide groups can be prepared separately and then added to the reaction mixture used for the preparation of the polyesters, or can also be formed in situ in the reaction mixture from their starting materials in the presence of the further components of the polyesters resin as is described for the saturated polyester resins, for instance, in the patents cited above. In the latter case, however, it should be noted that the unsaturated polyester components, particularly unsaturated polycarboxylic acids, are added to the reaction mixture only after sufficient and preferably complete formation of imide rings in order to preclude undesired side reactions. Groups capable of forming esters are primary or secondary alcoholic hydroxyl groups and carboxyl groups as well as groupings derived therefrom such as anhydrides, halogenides, esters and epoxides.

Examples of the compounds to be used according to the invention are materials shown in column A of Table I which can be prepared from the starting materials listed in columns B and C of the table:

TABLE I
PREPARATION OF IMIDES

| | A | B | C |
|---|---|---|---|
| 1 | N,N'-bis(2-hydroxyethyl)pyromellitic diimide | H₂N—CH₂—CH₂—OH | PMA (pyromellitic dianhydride) |
| 2 | N,N'-bis(2-hydroxypropyl)pyromellitic diimide | H₂N—CH₂—CH(CH₃)—OH | PMA |
| 3 | N,N'-bis(carboxymethyl)pyromellitic diimide | H₂N—CH₂—COOH | PMA |
| 4 | N,N'-bis(4-carboxyphenyl)pyromellitic diimide | H₂N—C₆H₄—COOH | PMA |
| 5 | Bis(hydroxyethyl)imide of BTDA-type dianhydride | H₂N—CH₂—CH₂—OH | 4,4'-oxydiphthalic anhydride |

TABLE I-continued
PREPARATION OF IMIDES

| | A | B | C |
|---|---|---|---|
| 6 | (bis-imide of BTCA with ethanolamine) | H₂N—CH₂—CH₂—OH | (BTCA dianhydride) |
| 7 | (N-(2-aminoethyl) trimellitimide with COOH) | H₂N—CH₂—CH₂—NH₂ | TMA (with COOH) |
| 8 | (bis-trimellitimide of hexamethylenediamine) | H₂N—(CH₂)₆—NH₂ | TMA |
| 9 | (bis-trimellitimide of trimethylhexamethylenediamine) | $H_2N-CH_2-\underset{\underset{CH_3-CH-CH_2}{\overset{CH_3}{|}}}{\overset{CH_3}{\underset{|}{C}}}-CH_2-CH_2-NH_2$ | TMA |
| 10 | (bis-trimellitimide of m-phenylenediamine) | m-phenylenediamine | TMA |

TABLE I-continued
PREPARATION OF IMIDES

| | A | B | C |
|---|---|---|---|
| 11 | HOOC-phenyl-imide-N-phenyl-CH$_2$-phenyl-N-imide-phenyl-COOH | 4,4'-methylenedianiline (H$_2$N-C$_6$H$_4$-CH$_2$-C$_6$H$_4$-NH$_2$) | TMA |
| 12 | bis-succinimide with CHOH-CH$_2$ groups, N—CH$_2$—CH$_2$—N bridge | H$_2$N—CH$_2$—CH$_2$—NH$_2$ | HOOC—CH(OH)—CH$_2$—COOH |
| 13 | phthalimide-N—CH$_2$—COOH with HOOC on ring | H$_2$N—CH$_2$—COOH | TMA |
| 14 | phthalimide-N—CH$_2$—CH$_2$—COOH with HOOC on ring | H$_2$N—CH$_2$—CH$_2$—COOH | TMA |
| 15 | tetrahydrophthalimide-N—CH$_2$—CHOH—CH$_2$OH | H$_2$N—CH$_2$—CHOH—CH$_2$OH | tetrahydrophthalic anhydride |

TABLE I-continued
PREPARATION OF IMIDES

| | A | B | C |
|---|---|---|---|
| 16 | 3,5-dicarboxyphenyl phthalimide | 5-amino-1,3-benzenedicarboxylic acid | phthalic acid |

It is evident from the listed compounds 1 to 16 that reaction products of, for instance,
(1) Tetracarboxylic acids and amino alcohols,
(2) Tetracarboxylic acids and amino carboxylic acids,
(3) Tricarboxylic acids and amino alcohols,
(4) Tricarboxylic acids and amino carboxylic acids,
(5) Tricarboxylic acids and primary diamines,
(6) Hydroxydicarboxylic acids and amino alcohols,
(7) Hydroxydicarboxylic acids and amino carboxylic acids,
(8) Hydroxydicarboxylic acids and diamines,
(9) Dicarboxylic acids and amino diols,
(10) Dicarboxylic acids and amino dicarboxylic acids,
can be used. Special importance can here by ascribed to compounds which are constructed of aromatic polycarboxylic acids and/or aromatic primary amines. The compounds produced here, in which the amide rings are bound directly to an aromatic ring or even participate directly therein, may be important to special applications of the resins, for instance, in the field of electric insulation.

The invention also relates to a method for manufacturing unsaturated homo- and/or copolymerizable linear polyesters of diols and at least one unsaturated dicarboxylic acid or its derivatives capable of forming esters, which is characterized by the feature that a diol with end-position hydroxyl groups and an average molecular weight of about 700 to 1200 is used as component A; one or more α,β-unsaturated dicarboxylic acids selected from the group consisting of maleic acid, fumaric acid, itaconic acid, citraconic acid, mesaconic acid and aconitic acid or their derivatives as component B; and a linear diol with 2 to 6 carbon atoms as component C are reacted with each other simultaneously where the equivalent ratio A:B is from about 0.8:1 to 1.2:1, and the equivalent ratio C:(A+B) is from about 0.5:1 to 1:1.

A compound preferably used as a component A is a polyester diol, most preferably a polyester diol which is obtained by glycolysis of polyethyleneterephthalate. The polyester diol which is preferred as component A was obtained by reacting polyethyleneterephthalate with propylene glycol in the weight ratio of polyethyleneterephthalate:propylene glycol of about 8:1 to 12:1.

Preferably, nitrogen-containing compounds of the general formulae:

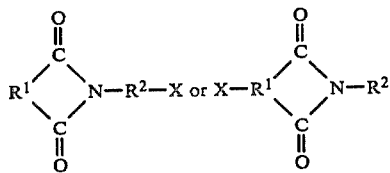

are used at the same time in the preparation of the polyesters or the polyester is reacted with the nitrogen-containing compounds of the general formulae above, wherein $R^1$ is an aliphatic radical in which the two carboxyl radicals capable of forming anhydrides are in the 1,2- or 1,3- position; $R^2$ is an alkyl or aryl radical; and X is an OH or $CO_2H$ radical, wherein optionally the linkage of the hydroxyl groups of the nitrogen-containing compound to the hydroxy groups of the unsaturated polyester is accomplished with di- or triisocyanates.

In another embodiment of the method according to the invention, radicals of a dicarboxylic acid, a dialcohol and/or a hydroxy-carboxylic acid with at least one 5-membered cyclic amide group are condensed into the polyester.

The unsaturated polyesters are prepared in a known manner by fusion condensation. In this process, unsaturated polyesters are produced which are highly soluble in styrene to yield unsaturated polyester resins. The latter also exhibit a heavily pronounced structural viscosity and thixotropy with very high styrene contents.

The invention also relates to the use of solutions of the polyesters according to the invention in copolymerizable vinyl and/or allyl monomers, the polyester content of the solutions being about 40 to 80% by weight and which additionally contain known hardeners and optionally, accelerators and flow agents, for impregnating electric machines or parts thereof as well as for a coating compound for electrical components and circuits. Polyester resins are also highly suited as impregnating resins in the construction of electric machines, for impregnating stators, rotors, transformers and other coils. Due to the useful flow anomalies, the dripping losses prior to the hardening as well as the dripping losses during the oven hardening are greatly reduced. This improves the filling of the cavities in the windings between the wires over that obtained with conventional unsaturated polyester resin impregnating media. This results in better solidification of the windings and better heat removal from the windings.

Due to the reduction of the dripping losses during hardening in the oven, the cost factors of the process are improved since less material is lost as hardened drippings in the oven which must be discarded. If the unsaturated polyester resins are used as coating compounds for electrical or electronic components and circuits, conventional fillers and/or reinforcement materials such as quartz meal, chalk, aluminum hydroxide or asbestos or glass fibers can be admixed to the resins. After adding suitable photoinitiators, these resins can also be hardened by exposure to ultraviolet radiation.

To achieve the desired flow anomalies, it is not necessary to use exclusively the polyesters according to the invention as the unsaturated polyesters. The solution can rather contain additionally unsaturated polyesters and/or polyester imides which are free of flow anomalies, in an amount of up to 90% by weight based on the total amount of unsaturated polyesters and polyester imides. Here, the unsaturated polyesters or polyester imides can be employed which are known to be suitable as electric insulating materials.

The invention will be described in greater detail with the aid of the following examples.

EXAMPLE 1

(a) Glycolysis of Polyethylene Glycol Terephthalate

In a flask equipped with a stirrer, reflux condenser and thermometer, 7300 g polyethylene glycol terephthalate are slowly melted at 275° C. Next, 370 g of proplylene glycol are slowly dropped-in during one hour. After another hour of reaction time at 275° C., the material is cooled. It has a hydroxyl equivalent of about 500.

(b) Preparation of Unsaturated Polyester 500 g of the polyester diol prepared in accordance with (a) are reacted with 98 g maleic acid anhydride and 60 g dimethylformamide in a flask equipped with a stirrer, thermometer and water separator with reflux cooling under nitrogen. After the exothermic process has decayed, 38 g of 1,2-propylene glycol are added dropwise at 200° C. The reaction is continued at 200° to 210° C. until the acid number has dropped below 35. After adding 1 g of hydroquinone, the melted resin, after cooling to 150° C., is taken up in 450 g styrene. The resulting resin exhibits extremely high structural viscosity. After cooling to 75° C., another 200 g styrene are added. The product so obtained is added to an unsaturated polyester which is imide-modified and dissolved in styrene containing 1 mol N-hydroxyethyltetrahydrophthalic acid imide, 1 mol maleic acid anhydride and 0.33 mol trimethylol propane in such an amount that the content of polyester according to the invention is 10% of the total amount of unsaturated polyester. The viscosity of the product so obtained is measured in a rotation viscosimeter. It is found that with an increase of the shear gradient from 3 to 200 s$^{-1}$, the viscosity drops by 80%. If this measurement is repeated at 80° C., the same effect is observed.

EXAMPLE 2

(a) Preparation of a Polyester Diol (Component A)

A polyester terminated by hydroxyl groups is prepared from 0.055 mol butane diol-1,4 and 0.05 mol dimethylsebacate with 0.1% lead oxide as a catalyst. For this purpose, the condensation reaction is first carried out for two hours at 170° C. Thereupon, the pressure is slowly reduced to 0.05 Torr. The condensation reaction is completed over four hours at 250° C.

(b) Preparation of an Unsaturated Polyester 500 g of the product prepared in accordance with (a) are further processed according to Example 1(b) in the same manner as the polyester diol prepared in accordance with Example 1(a). The product obtained exhibits the same properties as in Example 1.

USE OF THE UNSATURATED POLYESTER RESINS

The unsaturated polyester resins according to the invention are used in a styrene solution alone as well as in the described mixtures with polyester resins known from the state of the art after adding 1% by weight tert.-butylperbenzoate, for impregnating stators of a standard motor by the immersion method. The hardening of the resin is carried out over two hours at 140° C. Dripping losses in the oven of 5 to 10% by weight are found, and excellent impregnations result.

We claim:

1. An improved unsaturated homo- and/or copolymerizable linear polyester prepared from diols and at least one unsaturated dicarboxylic acid or its derivatives capable of forming esters, the improvement comprising that the polyesters contain as component (A), a diol with end-position hydroxyl groups and an average molecular weight of 700 to 1200; as component (B), one or more α,β-unsaturated dicarboxylic acids selected from the group consisting of maleic acid, fumaric acid, itaconic acid, citraconic acid, mesaconic acid, aconitic acid, their derivatives or mixtures thereof; and as component (C), a condensed-in linear diol with 2 to 6 carbon atoms, where the equivalent ratio A:B is aout 0.8:1 to 1.2:1 and the equivalent ratio C:(A+B) is from about 0.5:1 to 1:1.

2. The polyester according to claim 1, wherein the component (A) is a polyester diol.

3. The polyester according to claim 2, wherein the component (A) is obtained by glycolysis of polyethyleneterephthalate.

4. The polyester according to claim 3, wherein the component (A) is obtained by reaction of polyethyleneterephthalate with propylene glycol in the weight ratio polyethyleneterephthalate:propylene glycol of from about 8:1 to 12:1.

5. The polyester according to claims 1, 2, 3 or 4, wherein the polyesters are modified by nitrogen-containing compounds of the general formulae:

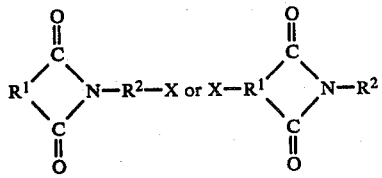

wherein R$^1$ is an aliphatic radical in which the two carboxyl radicals capable of forming anhydrides are 1,2- or 1,3- position; R$^2$ is an alkyl or aryl radical; and X is an OH or CO$_2$H radical, wherein optionally the linkage of the hydroxyl groups of the nitrogen-containing compounds to the hydroxyl groups of the unsaturated polyester is accomplished by means of di- or triisocyanates.

6. The polyester according to claims 1, 2, 3 or 4, wherein radicals with at least one 5-membered cyclic imide group selected from the group consisting of radicals of a dicarboxylic acid, a dialcohol, a hydroxycarboxylic acid and mixtures thereof are condensed into the polyesters.

7. An improved method for preparing unsaturated homo- and/or copolymerizable linear polyesters from diols and at least one unsaturated dicarboxylic acid or carboxylic acid derivative capable of forming esters, the improvement comprising simultaneously reacting (A) a diol with end-position hydroxyl groups and an average molecular weight of 700 to 1200, (B) one or more α,β-unsaturated dicarboxylic acids selected from the group consisting of maleic acid, fumaric acid, itaconic acid, citraconic acid, mesaconic acid, aconitic acid and their derivatives, and (C) a linear diol with 2 to 6 carbon atoms, where the equivalent ratio of A:B is from about 0.8:1 to 1.2:1 and the equivalent ratio of C:(A+B) is from about 0.5:1 to 1:1.

8. The method accroding to claim 7, wherein a polyester diol is employed as component (A).

9. The method according to claim 8, wherein a polyester diol is used as component (A) which is obtained by glycolysis of polyethyleneterephthalate.

10. The method according to claim 9, wherein a polyester diol is employed as component (A) which is obtained by reaction of polyethyleneterephthalate with propylene glycol in the weight ratio of polyethyleneterephthalate:propylene glycol of from about 8:1 to 12:1.

11. The method according to claims 7, 8, 9 or 10, characterized by the feature that in the preparation of the polyesters, nitrogen-containing compounds of the general formulae:

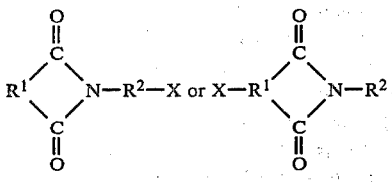

are employed at the same time or the preformed polyesters are reacted with the nitrogen-containing compounds of the general formulae above, wherein $R^1$ is an aliphatic radical at which the two carboxyl radicals capable of forming an anhydride are in the 1,2- or 1,3-position; $R^2$ is an alkyl or aryl radical; and X is an OH or $CO_2H$ radical, wherein optionally, the linkage of the hydroxyl groups of the nitrogen-containing compounds can take place to the hydroxyl groups of the unsaturated polyester by means of di- or triisocynates.

12. The method according to claims 7, 8, 9 or 10, wherein radicals with at least one 5-membered cyclic imide group selected from the group consisting of the radicals of a dicarboxylic acid, a dialcohol, a hydrocarboxylic acid and mixtures thereof are condensed into the polyester.

13. The use of the polyesters of claims 1, 2, 3 or 4, with copolymerizable vinyl monomers, allyl monomers or mixtures thereof, the polyester content of which is about 40 to 80% by weight of the solution and which solution further contains hardeners and optionally, accelerators and flow agents, for impregnating electric machinery or parts thereof.

14. The use of a solution of the polyesters according to claims 1, 2, 3 or 4, with copolymerizable vinyl monomers, allyl monomers or mixtures thereof, the polyester content of which is about 40 to 80% by weight of the solution and which solution further contains hardeners and optionally, accelerators and flow agents, as a coating compound for electrical and/or electronic components and circuits.

15. The use of the solution of claim 13 wherein the solution additionally contains unsaturated polyesters, polyester imides or mixtures thereof, which are free of flow anomalies, in an amount of up to 90% by weight based on the total amount of unsaturated polyesters and polyester imides in said solution.

16. The use of the solution of claim 14 wherein the solution additionally contains unsaturated polyesters, polyester imides or mixtures thereof, which are free of flow anomalies, in an amount of up to 90% by weight based on the total amount of unsaturated polyesters and polyester imides in said solution.

* * * * *